US010693341B1

(12) United States Patent
McAuley

(10) Patent No.: US 10,693,341 B1
(45) Date of Patent: Jun. 23, 2020

(54) MOTOR HUBS FOR SHUTTER MECHANISMS

(71) Applicant: N2 Imaging Systems, LLC, Irvine, CA (US)

(72) Inventor: Daniel E. McAuley, Irvine, CA (US)

(73) Assignee: N2 Imaging Systems, LLC, Irvine, CA (US)

( * ) Notice: Subject to any disclaimer, the term of this patent is extended or adjusted under 35 U.S.C. 154(b) by 0 days.

(21) Appl. No.: 16/271,294

(22) Filed: Feb. 8, 2019

(51) Int. Cl.
*H02K 5/24* (2006.01)
*G03B 9/10* (2006.01)
*H02K 7/116* (2006.01)
*G10K 11/162* (2006.01)

(52) U.S. Cl.
CPC ............ *H02K 5/24* (2013.01); *G03B 9/10* (2013.01); *H02K 7/116* (2013.01); *G10K 11/162* (2013.01)

(58) Field of Classification Search
CPC . F16C 11/103; F16D 1/06; F16D 1/08; H04K 5/22
See application file for complete search history.

(56) References Cited

U.S. PATENT DOCUMENTS

| 3,640,635 | A | * | 2/1972 | Von Hollen | B23B 45/001 408/101 |
| 5,303,688 | A | * | 4/1994 | Chiuminatta | B23D 61/025 125/15 |
| 5,881,449 | A | * | 3/1999 | Ghosh | G03B 9/08 264/619 |
| 2005/0058444 | A1 | * | 3/2005 | Watanabe | G03B 9/08 396/458 |

* cited by examiner

*Primary Examiner* — Noam Reisner
(74) *Attorney, Agent, or Firm* — Knobbe, Martens, Olson & Bear, LLP

(57) ABSTRACT

A motor hub system for shutter actuation includes a shaft sleeve including a base flange and an externally threaded collet extending axially from the base flange along a rotation axis. A flanged nut with internal threads is in threaded engagement with the collet, wherein the internal threads are in a threaded portion of the flanged nut that extends axially from a flange of the flanged nut. A washer is compressed axially between the base flange of the shaft sleeve and the flange of the flanged nut.

13 Claims, 4 Drawing Sheets

Fig. 4
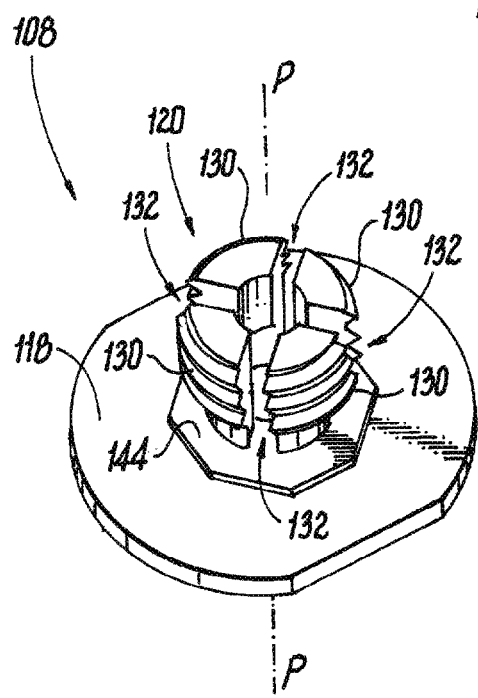
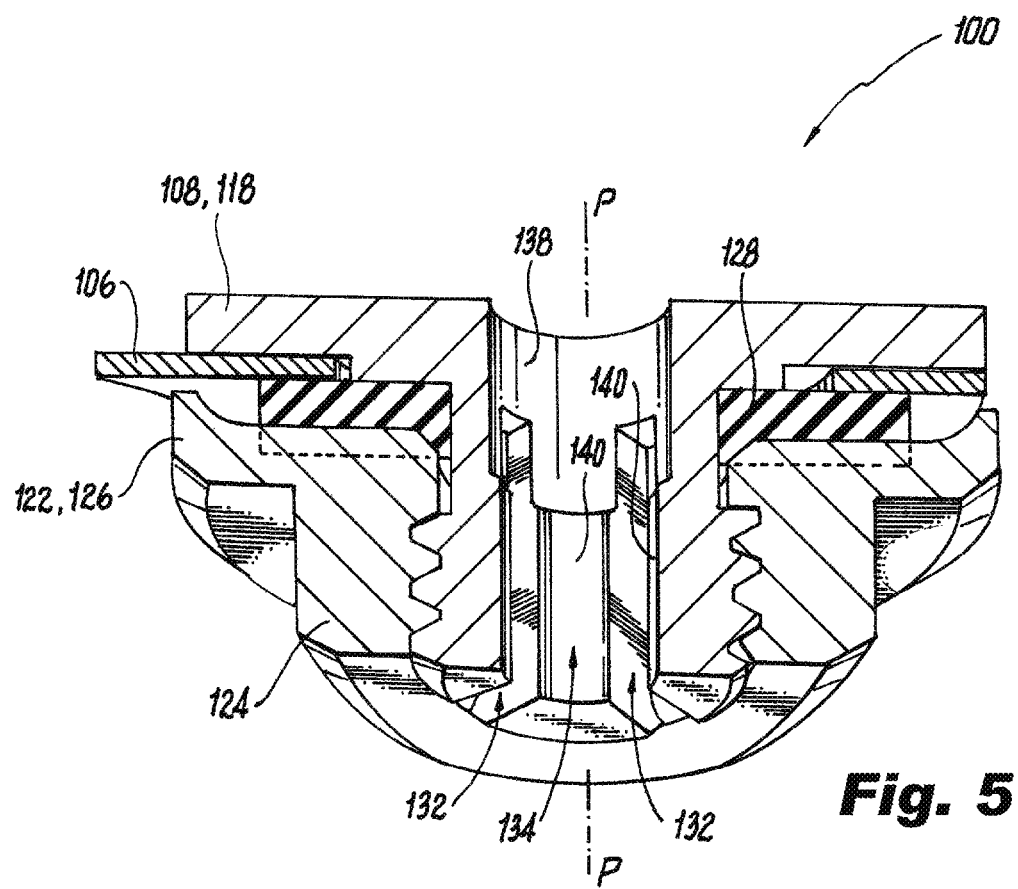
Fig. 5

MOTOR HUBS FOR SHUTTER MECHANISMS

BACKGROUND OF THE INVENTION

1. Field of the Invention

The present disclosure relates to imaging systems, and more particularly to shutter actuation for imaging systems.

2. Description of Related Art

Imaging systems such as cameras utilize shutters to cover over the imaging sensor. In infrared imaging systems, calibration shutters are used to recalibrate the imaging sensor. In this context, a shutter covers the sensor and the sensor images the shutter. The shutter can be temperature controlled, or a sensor can be used to determine the temperature of the shutter. Using the known temperature of the calibration shutter allows the system to recalibrate the imaging sensor. If this is done periodically, the imaging sensor can stay well calibrated. One drawback to shutter actuation is that the shutter can generate audible noise as it is actuated. In sound sensitive applications, the actuation noise of a calibration shutter can be a disadvantage.

The conventional techniques have been considered satisfactory for their intended purpose. However, there is an ever present need for improved shutter actuation. This disclosure provides a solution for this need.

SUMMARY OF THE INVENTION

A motor hub system for shutter actuation includes a shaft sleeve including a base flange and an externally threaded collet extending axially from the base flange along a rotation axis. A flanged nut with internal threads is in threaded engagement with the collet, wherein the internal threads are in a threaded portion of the flanged nut that extends axially from a flange of the flanged nut. A washer is compressed axially between the base flange of the shaft sleeve and the flange of the flanged nut.

A shutter flag can be mounted about the collet axially between the washer and the base flange for vibration isolation. The shutter flag can be compressed between the washer and the base flange to mitigate vibration of the shutter flag relative to the base flange.

An output shaft can be engaged within the collet for rotation of the shutter flag about the rotation axis. A motor can be operatively connected to a gearbox, wherein the output shaft is an output shaft of the motor and gearbox wherein the motor actuates rotation of the shutter flag. A frame can be included with an imaging sensor seated in the frame, wherein the shutter flag is configured to move from a first position clear of the imaging sensor to a second position that occludes the imaging sensor. A solid physical pathway for sound waves can be defined from the output shaft, through the collet, to the base flange, to the shutter flag. The solid physical pathway for sound waves can turn 90° from the output shaft into the collet, can turn 90° in the collet toward the base flange, and can turn back 90° degrees from the collet into the base flange.

The collet can include an inward facing contact area configured to engage a motor/gearbox shaft and a relieved area axially adjacent the inward facing contact area, wherein the relieved area has a larger diameter than the inward facing contact area. The inward facing contact area can be separated into a plurality of contact surfaces separated by slots. The collet can include a plurality of axially extending fingers circumferentially spaced apart from one another across respective slots. The threaded portion of the threaded nut can bias the fingers inward. The washer can include an elastic material and can be deformed by being compressed between the base flange of the shaft sleeve and the flange of the flanged nut.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4 is a perspective view of the shaft sleeve of the motor hub of FIG. 3; and FIG. 5 is a cross-sectional perspective view of the motor hub of FIG. 3, showing the motor hub with the output shaft removed.

DETAILED DESCRIPTION OF THE PREFERRED EMBODIMENTS

Figure 1:
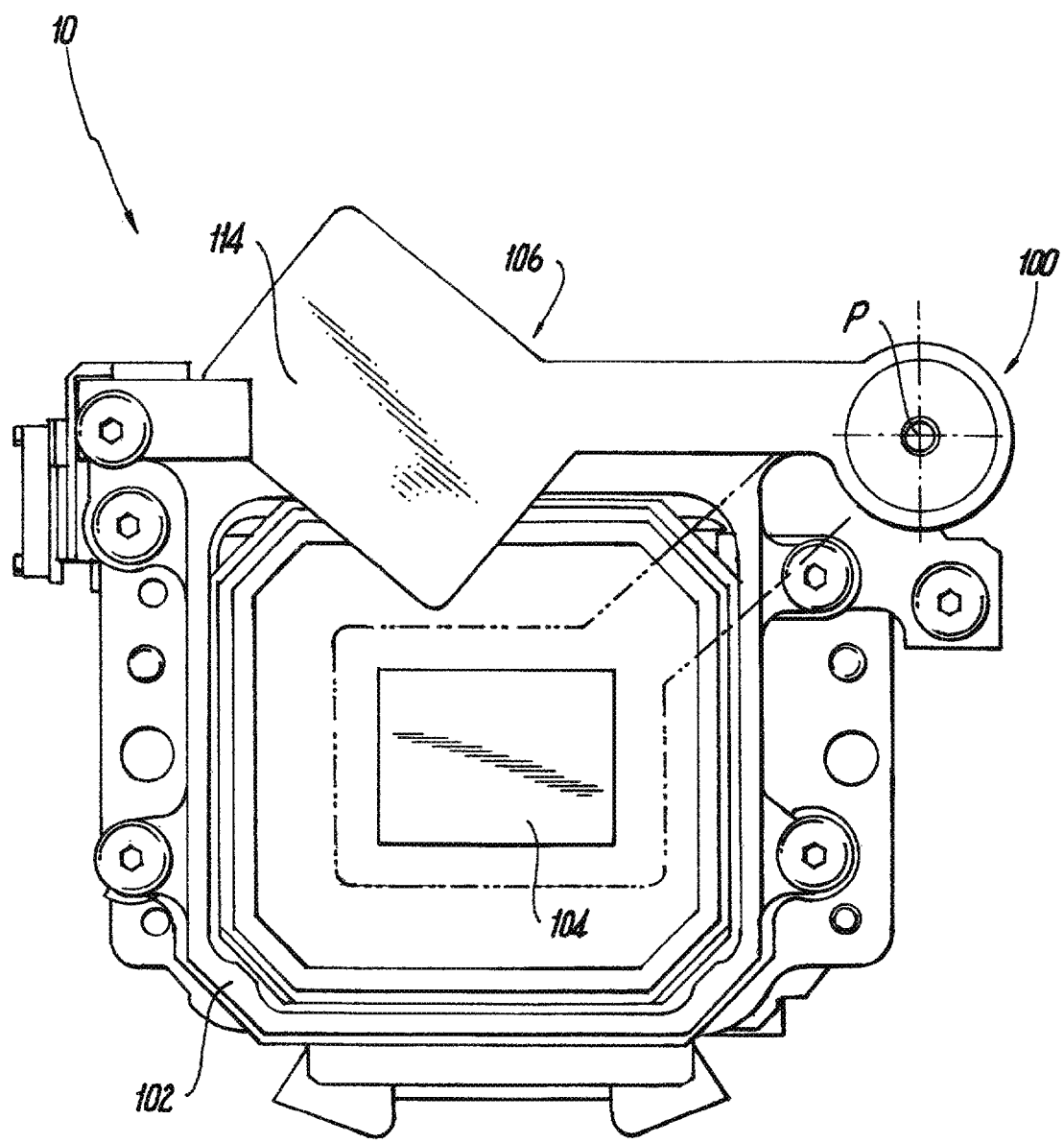
FIG. 1 is a plan view of an exemplary embodiment of a system constructed in accordance with the present disclosure, showing an imaging sensor with two positions of a shutter flag indicated.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used for reduced audible sound in shutter actuation for imaging systems.

The imaging device 10 includes a frame 102. An imaging sensor 104 is seated in the frame 102. A shutter 106 is pivotally mounted to the frame 102 by the motor hub system 100, which rotates along a rotation axis P (identified in FIG. 2). The shutter 106 is positioned to pivot between a first position that is clear of the imaging sensor 104, shown in solid lines in FIG. 1, and a second position (schematically indicated in FIG. 1 with broken lines) that occludes the imaging sensor 104, e.g., for calibrating the imaging sensor 104 using a known temperature of the flag portion 114.

Figure 2:
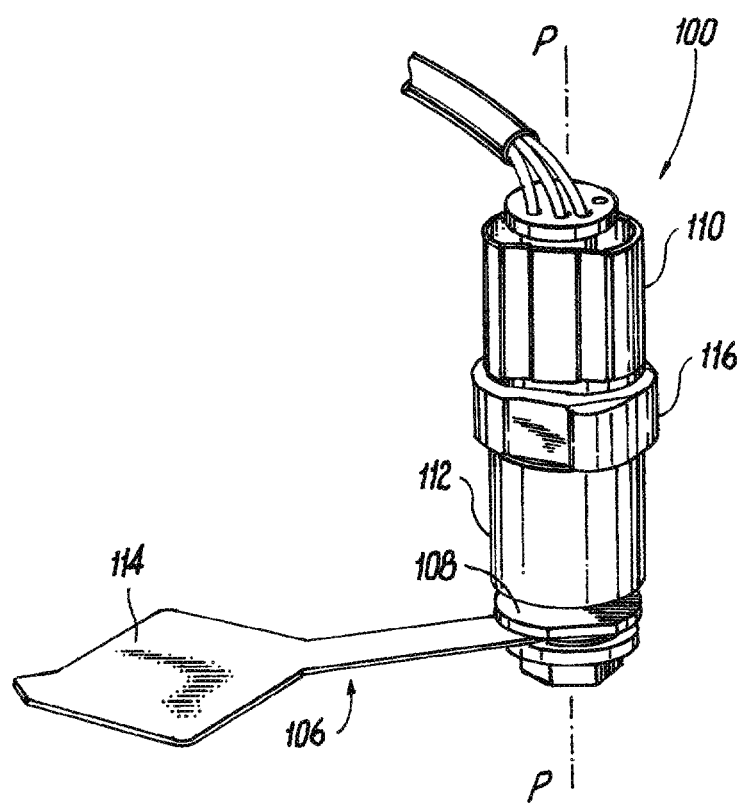
FIG. 2 is a perspective view of a portion of the system of FIG. 1, showing the motor/gearbox, motor hub, and shutter flag.

Referring now to FIG. 2, a motor 110 is operatively connected to a gearbox 112, which is operatively connected to the motor hub system 100 for shutter actuation wherein the motor 110 actuates rotation of the shutter flag 106 between the first and second positions. A motor mount 116 is assembled to the assembly of the motor 110 and gearbox 112 for mounting the assembly to the frame 102 as shown in FIG. 1.

Figure 3:
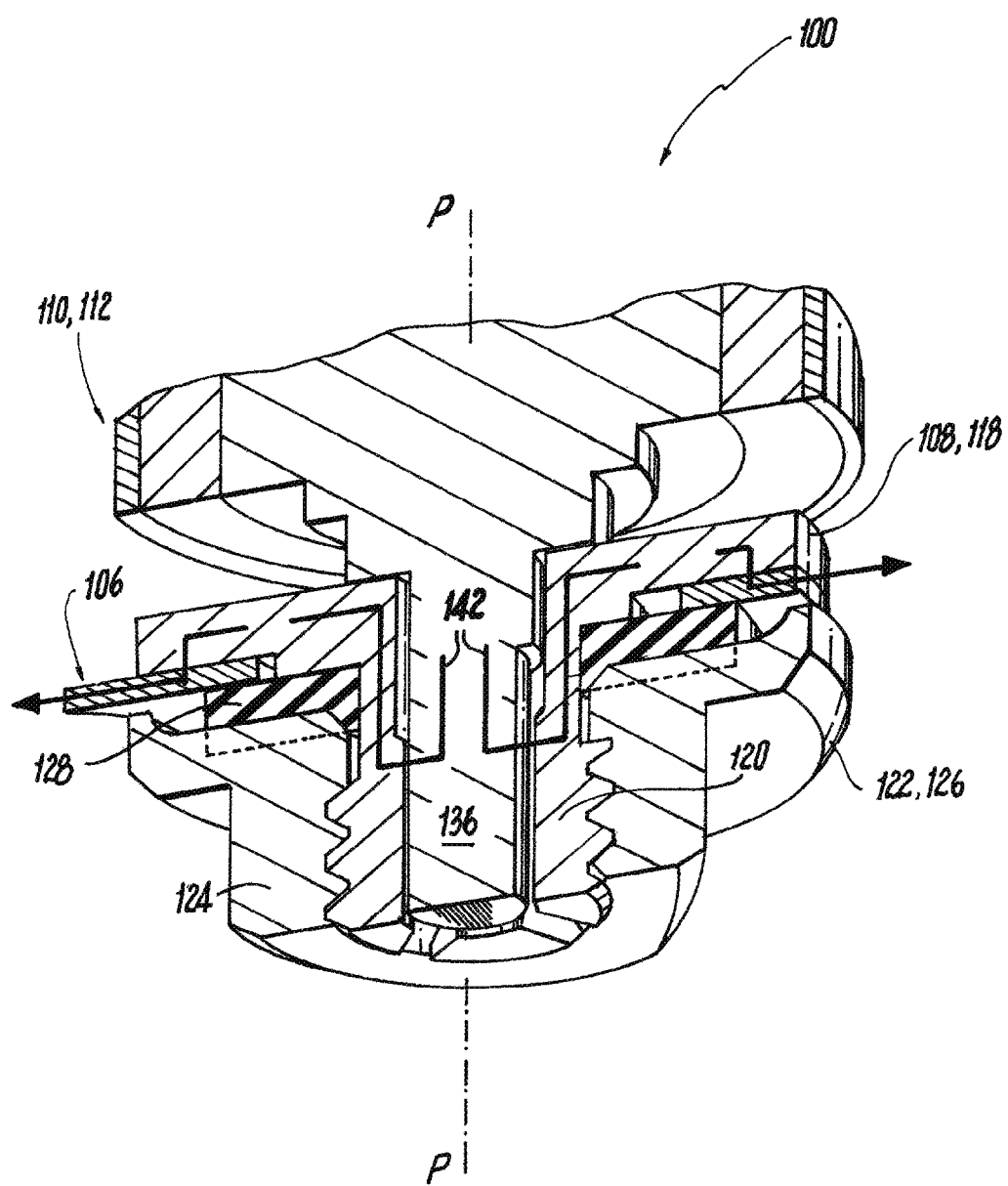
FIG. 3 is a cross-sectional perspective view of a portion of the system of FIG. 1, showing the output shaft of the motor/gearbox engaged with the motor hub.

With reference now to FIG. 3, a shaft sleeve 108 includes a base flange 118 and an externally threaded collet 120 extending axially from the base flange along the rotation axis P. An output shaft 136 of the motor 110 and gearbox 112 is engaged within the collet 120 for rotation of the shutter flag 106 (identified in FIG. 1) about the rotation axis P. A flanged nut 122 with internal threads is in threaded engagement with the external threads of the collet 120. The internal threads are in a threaded portion 124 of the flanged nut 122 that extends axially from a flange 126 of the flanged nut 122. A washer 128 is compressed axially between the base flange 118 of the shaft sleeve 108 and the flange 126 of the flanged nut 122. The washer 128 can include an elastic material that can be deformed by being compressed. The uncompressed cross-section of the washer 128 is shown schematically in FIG. 3 in broken lines. The shutter flag 106 is mounted about the collet 120 compressed axially between the washer 128 and the base flange 118 for vibration isolation when the shutter flag 106 actuates, e.g. to mitigate audible noise from vibration of the shutter flag 106 relative to the base flange 118.

With reference now to FIG. 4, the collet 120 includes four axially extending fingers 130 circumferentially spaced apart from one another across respective slots 132. As shown in FIG. 5, the collet 120 includes an inward facing contact area 134 configured to engage the output shaft 136 (omitted in FIG. 5, but identified in FIG. 3) and a relieved area 138 axially adjacent the inward facing contact area 134, wherein the relieved area 138 has a larger diameter than the inward facing contact area 134. The inward facing contact 134 is separated into four contact surfaces 140 or fingers separated by the slots 132. The slots 132 and relieved area 138 provided reduced contact area between the output shaft 136 and the shaft sleeve 108. The four fingers or contact surfaces 140 can flex torsionally a small amount which adds compliance to absorb torque spikes from the motor 110 that might otherwise vibrate the system 100. The threaded portion 124 of the threaded nut 122 biases the fingers 130 of the collet 120 inward toward the rotation axis P to increase engagement between the output shaft 136 (shown in FIG. 3) and the contact surfaces 140.

Referring again to FIG. 3, a solid physical pathway 142 for sound waves is defined from the motor/gearbox 110/112 via output shaft 136, through the collet 120 (through the contact surfaces 140), to the base flange 118, to the shutter flag 106. The solid physical pathway 142 for sound waves turn 90° from the output shaft 136 into the collet 120. The pathway 142 also turns 90° in the collet 120 toward the base flange 118 and can turn back 90° degrees from the collet 120 into the base flange 118. These direction changes attenuate transmission of vibration along the pathway 142. Physical interfaces and/or changes in material in the pathway 142, such as from output shaft 136 to the collet 120, and from the base flange 118 to the shutter flag 106, also attenuate transmission of vibration. This ultimately impedes audible noise escaping the system 100 during shutter actuation, resulting in quieter shutter actuation than in traditional shutter actuation. A second pathway also exists through the lower end of the shaft sleeve 108, which also has structure for reducing vibration transmission. From the small contact between the shaft and sleeve, the threaded connection at the nut 122 also represents reduced contact area and a part-to-part interface. Any vibration would have to turn 90 degrees within the nut 122 before being further reduced by the elastic washer 128 in contact with the shutter 106.

Overall, the coupling between the output shaft 136 and flag portion 114 is not hard or rigid. Built-in compliance can reduce the spikes in drive torque from resonating the flag portion 114 which might otherwise create audible noise. This compliance also addresses the action/reaction aspect in which the motor drive unit can be inherently noisy (e.g. including the electric motor 110 with multiple stages of gear reduction with back-lash and loose ball bearings). When using a soft coupling, the vibrations that lead to audible noise from the actuator itself can be damped out. Related to these reductions in vibration, a goggle/camera system overall can be less noisy using systems and methods as disclosed herein. With less vibration in the shutter, less will be able to migrate to any components beyond the shutter. The shell of a goggle, for example, will create noise if vibrations resonate it, which can be mitigated or eliminated by systems and methods as disclosed herein.

The shutter 106 is generally driven via friction-drive within the motor hub system 100. Tightening of the nut 122 and collet 120 grips the shutter 106 between the washer 128 and the base flange 118 of the shaft sleeve 106. This squeeze works to drive the shutter 106 between the open and closed positions. As assurance that the flag position will not slip substantially within this assembly, a keying feature 144 exists on the shaft sleeve 106 that loosely engages a similarly shaped hole through the shutter 106.

The methods and systems of the present disclosure, as described above and shown in the drawings, provide for shutter actuation with superior properties including reduced audible noise compared to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A motor hub system for shutter actuation comprising:
   a shaft sleeve including a base flange and an externally threaded collet extending axially from the base flange along a rotation axis;
   a flanged nut with internal threads in threaded engagement with the collet, wherein the internal threads are in a threaded portion of the flanged nut that extends axially from a flange of the flanged nut; and
   a washer compressed axially between the base flange of the shaft sleeve and the flange of the flanged nut.

2. The system as recited in claim 1, further comprising a shutter flag mounted about the collet axially between the washer and the base flange for vibration isolation.

3. The system as recited in claim 2, wherein the shutter flag is compressed between the washer and the base flange to mitigate vibration of the shutter flag relative to the base flange.

4. The system as recited in claim 2, further comprising an output shaft engaged within the collet for rotation of the shutter flag about the rotation axis.

5. The system as recited in claim 4, further comprising a motor operatively connected to a gearbox, wherein the output shaft is an output shaft of the motor and gearbox wherein the motor actuates rotation of the shutter flag.

6. The system as recited in claim 5, wherein a solid physical pathway for sound waves is defined from the output shaft, through the collet, to the base flange, to the shutter flag.

7. The system as recited in claim 6, wherein the solid physical pathway for sound waves turns 90° from the output shaft into the collet, turns 90° in the collet toward the base flange, and turns back 90° degrees from the collet into the base flange.

8. The system as recited in claim 1, wherein the collet includes inward facing contact area configured to engage a motor/gearbox shaft and a relieved area axially adjacent the inward facing contact area, wherein the relieved area has a larger diameter than the inward facing contact area.

9. The system as recited in claim 8, wherein the inward facing contact area is separated into a plurality of contact surfaces separated by axial slots.

10. The system as recited in claim 8, further comprising a frame with an imaging sensor seated in the frame, wherein the shutter flag is configured to move from a first position clear of the imaging sensor to a second position that occludes the imaging sensor.

11. The system as recited in claim 1, wherein the collet includes a plurality of axially extending fingers circumferentially spaced apart from one another across respective slots.

12. The system as recited in claim 11, wherein the threaded portion of the threaded nut biases the fingers inward.

13. The system as recited in claim 1, wherein the washer includes an elastic material and is deformed by being compressed between the base flange of the shaft sleeve and the flange of the flanged nut.

* * * * *